STRATIFICATION TEMPERATURES $$\dot{W}_P = \frac{3KA[(t_{2T}-t_{1B})^{\frac{7}{3}} - (t_{1T}-t_{2B})^{\frac{7}{3}}]}{7[h_{fg}+(C_D+\chi C_c-C_c)(t_{2B}-t_{1B})][(t_{2T}-t_{1B})-(t_{1T}-t_{2B})]}$$

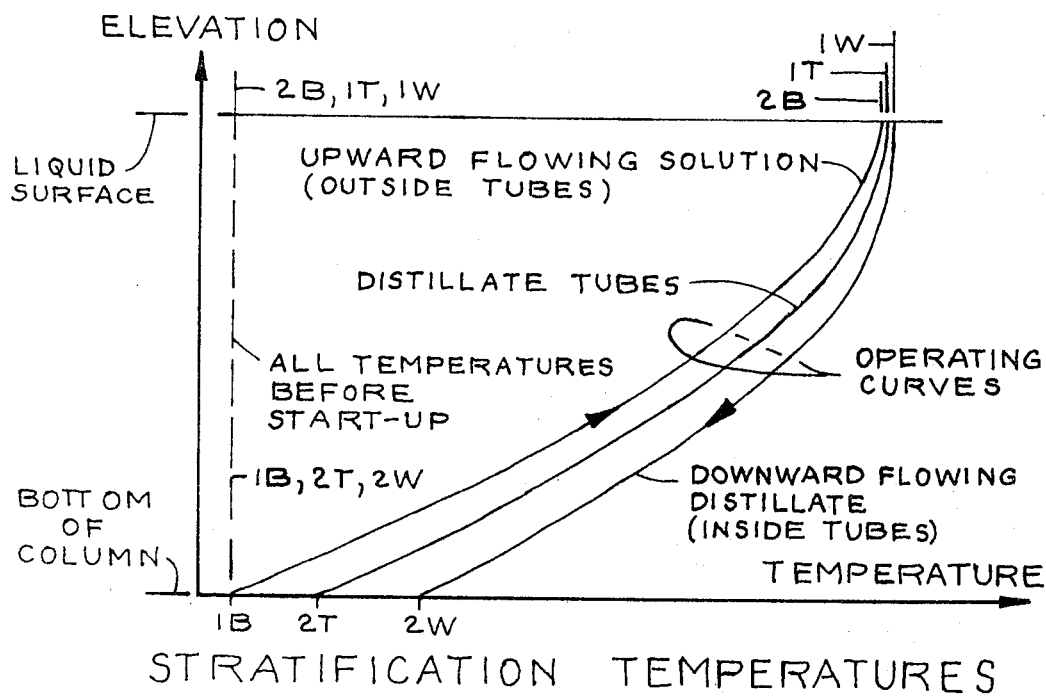

$\dot{W}_P$ = VAPORIZATION RATE (SINKWELL CONTRIBUTION NOT INCLUDED)

K = CONSTANT

A = SUBMERGED AREA OF DISTILLATE TUBES $t$ = TEMPERATURE $h_{fg}$ = HEAT OF VAPORIZATION OF DISTILLATE $\chi$ = COLUMN FEED RATIO = $\frac{\dot{W}_S}{\dot{W}_P}$ $C_D$ = SPECIFIC HEAT OF DISTILLATE $C_C$ = SPECIFIC HEAT OF CONCENTRATED SOLUTION $\dot{W}_S$ = MASS FLOW RATE OF SOLUTION

FIG. 3

*Charles T. Sundquist*

$t$ = TEMPERATURE $t'_2 > t_2 \quad t'_1 > t_1$ $C_D$ = SPECIFIC HEAT OF DISTILLATE $C_S$ = SPECIFIC HEAT OF SOLUTION $C_C$ = SPECIFIC HEAT OF CONCENTRATED SOLUTION $h_{fg}$ = VAPORIZATION HEAT OF DISTILLATE $\dot{W}_P$ = MASS FLOW RATE OF VAPOR $\dot{W}_S$ = MASS FLOW RATE OF SOLUTION $\dot{W}_C$ = MASS FLOW RATE OF CONCENTRATED SOLUTION $\dot{m}$ = UPWARD MASS FLUX $\dot{M}$ = DOWNWARD MASS FLUX $q_{IN}$ = THERMAL ENERGY INTO SYSTEM $q_{SUR}$ = THERMAL ENERGY TO LIQUID SURFACE

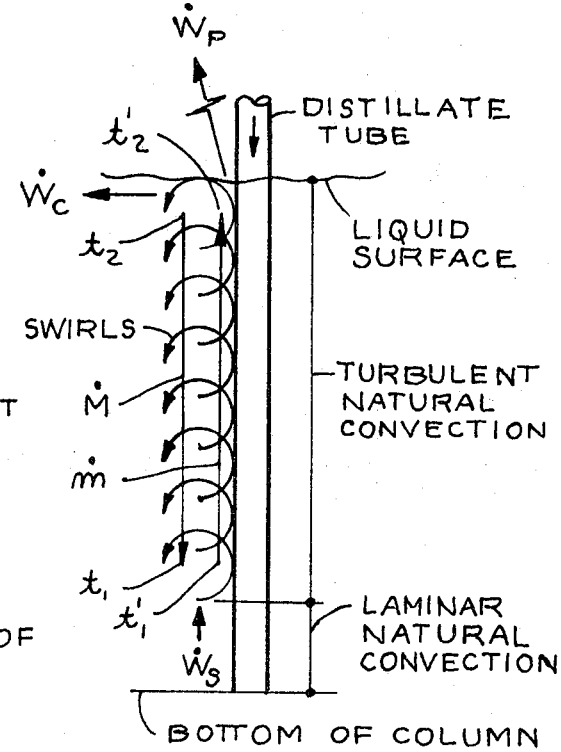

$$q_{IN} = C_S\left[(t'_2 - t'_1)\dot{m} - (t_2 - t_1)\dot{M}\right] + \dot{W}_S C_S t_1 = q_{SUR}$$

$$q_{SUR} = C_S(\dot{m} t'_2 - \dot{M} t_1) - \dot{W}_C C_C t_2 - \dot{W}_P\left[h_{fg} + C_D(t_2 - t_1)\right]$$

$$\dot{W}_P = \frac{C_S(\dot{m} t'_1 - \dot{M} t_1) - \dot{W}_C C_C t_2 - \dot{W}_S C_S t_1}{h_{fg} + C_D(t_2 - t_1)}$$

SWIRL REFRIGERATION

FIG. 4

United States Patent Office 3,444,050
Patented May 13, 1969

3,444,050
DISTILLAND HEATING WITH HOT DISTILLATE
Charles T. Sundquist, 12566 SE. 53rd St.,
Bellevue, Wash. 98004
Filed Aug. 29, 1966, Ser. No. 575,689
Int. Cl. C02b *1/06;* B01d *3/00*
U.S. Cl. 202—177                                       18 Claims

ABSTRACT OF THE DISCLOSURE

Hot distillate recovered from a distillation process is further heated to a temperature close to its boiling point and employed as the heating medium for distillation of a sea water feed. The feed concentrate is then heat exchanged with cold feed for preheating the latter. A portion of the distillate is recycled in direct contact with the vapor of distillation to condense the vapor.

---

This invention relates to the distillation process. A natural refrigerating phenomenon and a thermal energy recycling scheme are employed to achieve high thermal efficiency in the separation of distillate from solution. The invention includes automatic controls necessary for sustained operation.

An object of the invention is the separation of a distillate from a solution.

An object of the invention is the concentration of a solution.

An object of the invention is the separation of a distillate from a liquid suspension.

FIGURE 3 is an elevation-temperature diagram of a temperature stratification column.

FIGURE 4 is a diagram illustrating the natural refrigerating phenomenon as it occurs in the temperature stratification column.

Figure 1:
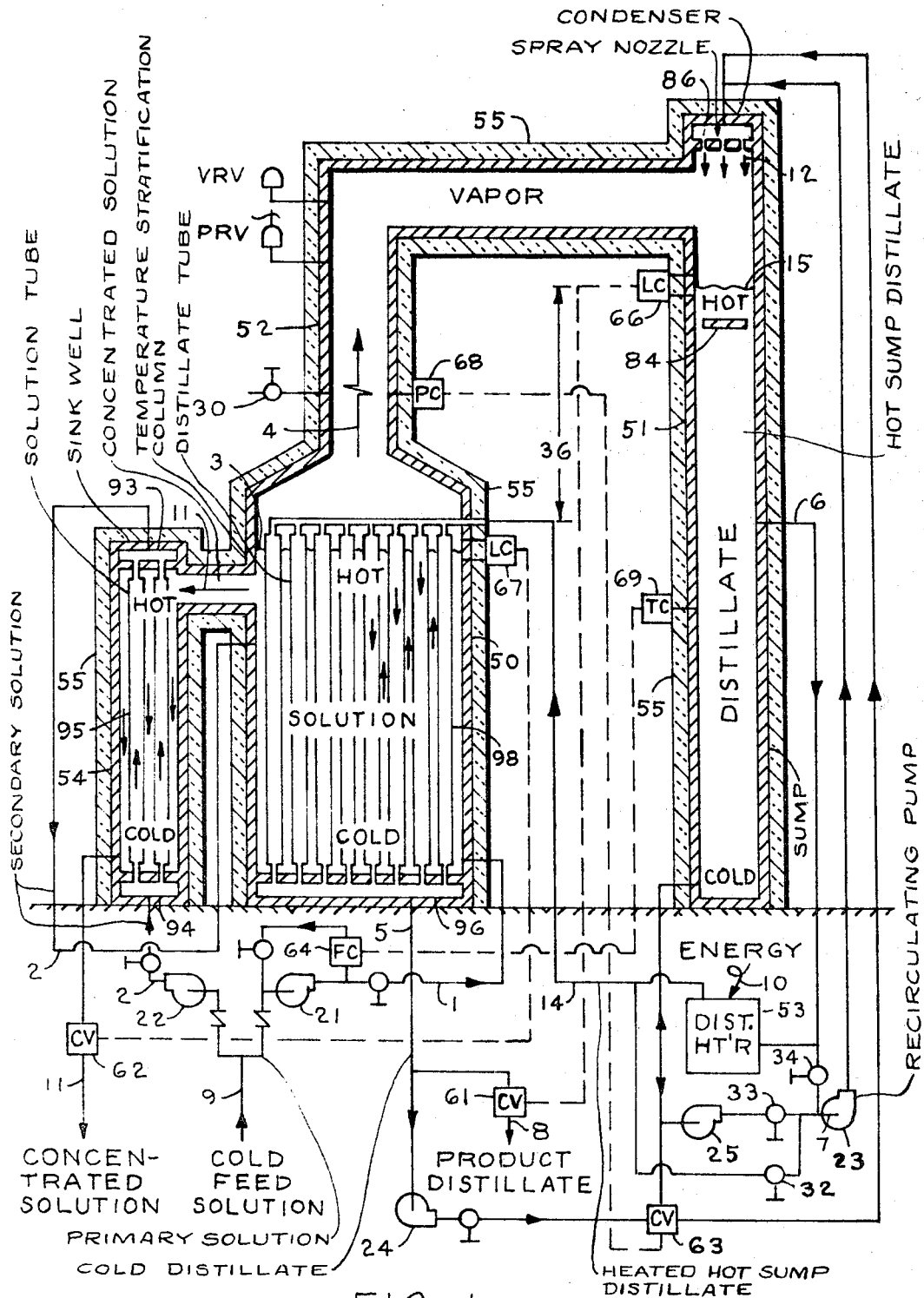
FIGURE 1 is a flow diagram showing processes and control systems in the preferred embodiment of the invention.

Referring to FIGURE 1, cold feed solution 9 enters the process. It is divided into two parts, one part going to primary solution pump 21 and the other part going to secondary solution pump 22. Primary solution 1 enters the bottom of temperature stratification column 50. Secondary solution 2 enters the bottom of sink well 54.

In the temperature stratification column, the primary solution enters the space surrounding distillate tubes 98. The solution slowly rises to liquid surface 3. As it rises, it is heated by the distillate tubes. In the sink well the secondary solution enters first lower solution box 94 and then solution tubes 95. The secondary solution is also heated as it rises inside the solution tubes.

At the top of the sink well the hot secondary solution leaves the solutions tubes and enters upper solution box 93. From thence it is fed into the temperature stratification column, part way up, where it mixes with hot primary solution. Concentrated solution 11 slowly descends in the sink well, being cooled on the way down. Leaving the sink well, it passes through two-way control valve 62 and exits from the distiller.

Vapor 4 separates from the hot solution in the temperature stratification column. The vapor passes from the temperature stratification column, through chimney 52, into condenser 51, where it is condensed by direct contact with spray distillate 12. The spray distillate is a mixture of cold distillate 5 and hot sump distillate 6 and is sprinkled into the condenser through spray openings 86. Recirculating pump 23 maintains a flow of spray distillate through the spray openings sufficient to keep the temperature of hot sump distillate 6 and the vapor nearly the same. Splash deflector 84 confines the turbulence caused by the falling spray distillate to the top of the condenser sump.

A portion of the hot sump distillate is drawn off and fed through distillate heater 53. Heated hot sump distillate 14, from the distillate heater, flows into the tops of distillate tubes 98. A static head 36 is maintained on the highest elevation reached to prevent boiling.

Any source of thermal energy can be used to heat the hot sump distillate. Heat from hot vapor, hot liquid or electric resistors is acceptable so long as its temperature is a few degrees above the solution vaporization temperature.

Distillate flows very slowly downward inside the distillate tubes to distillate box 96, being cooled along the way. Leaving the distillate box, part of cold distillate 5 is drawn from the system through two-way control valve 61, becoming product distillate 8. The remainder of cold distillate 5 flows to large distillate pump 24 and thence to three-way control valve 63.

Liquid level controller 66 senses increases in the quantity of distillate in the system at liquid surface 15. It corrects for these increases by remotely operating two-way control valve 61 to release product distillate 8 from the distiller. Liquid level controller 67 senses increases in the level of liquid surface 3. It corrects for these increases by remotely opearting two-way control valve 62 to release concentrated solution 11 from the distiller.

Three-way control valve 63 alternately directs the flow of cold distillate to the bottom of the condenser sump and to the spray openings in the top of the condenser. Small distillate pump 25 pumps slower than large distillate pump 24. It takes suction from three-way control valve 63 and the bottom of the condenser sump. Cold distillate from small distillate pump 25 continuously mixes with hot sump distillate 6 and flows as distillate mixture 7 to the suction of recirculating pump 23. With this arrangement, cold distillate alternately flows into and out of the bottom of the condenser sump.

Pressure controller 68 has high and low pressure set points, where the control actions reverse. During pressure rise, the controller remotely operates three-way control valve 63 to direct the cold distillate flow from large distillate pump 24 to the bottom of the condenser sump. Because the flow of distillate mixture 7, alone, has insufficient cooling capacity to condense all of the flow of vapor 4, the condenser now operates in an under-condensing manner. During pressure drop, pressure controller 68 remotely operates three-way control valve 63 to direct the cold distillate flow, from large distillate pump 24, to spray openings 86 at the top of the condenser. The combiner cooling capacity of the flow of distillate mixture 7 and the cold distillate from large distillate pump 24 is more than enough to condense all of the flow of vapor 4. The condenser now operates in an over-condensing manner.

Temperature controller 69 has high and low temperature set points, where the control actions reverse. During temperature rise, the controller remotely operates flow control 64 to reduce the flow of primary solution 1. The flow of concentrated solution 11, leaving the distiller is reduced. Vapor 4 is produced more rapidly. Thermal energy in the condenser sump is now increasing. During temperature drop, temperature controller 69 remotely operates flow control 64 to increase the flow of primary solution 1. The flow of concentrated solution 11 is increased. Vapor 4 is produced less rapidly. Thermal energy in the condenser sump is now decreasing.

The net effect of the flow processes and control systems described above is that the average cooling capacity of cold distillate 5 (discounting product distillate 8) exactly matches that required to condense the average flow of vapor 4. This means that thermal losses, resulting from the use of strictly cooling fluids, are avoided. Thermal losses result only from the flow of product distillate 8, the flow of concentrated solution 11 and transmission through the surfaces surrounding the system. The entire system is insulated by insulating jacket 55.

The pressure of vapor 4 is maintained within a limited range, just above atmospheric pressure. The large vessels of the system are economical low pressure type. Also, air is excluded from the vapor space by a protective pressure differential.

Figure 2:
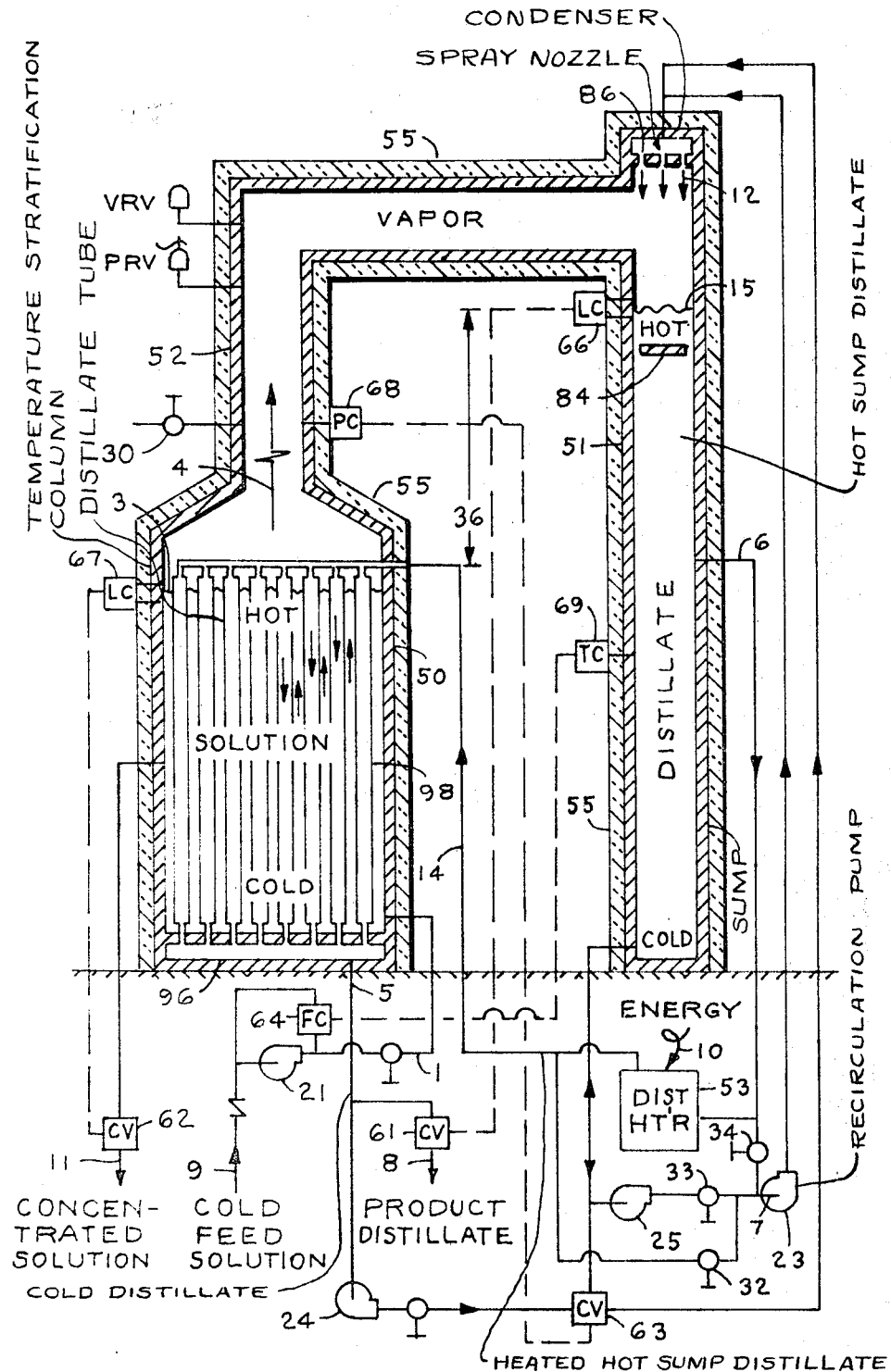
FIGURE 2 is a flow diagram showing processes and control systems in a modified embodiment of the invention.

FIGURE 2 is a flow diagram showing processes and control systems in a modified embodiment of the distiller. The sink well and the secondary solution flow have been eliminated, simplifying the distiller. Everything else remains the same.

FIGURE 3 is an elevation-temperature diagram of the temperature stratification column. It illustrates how the column is operated.

At any given elevation, the rate at which heat is transferred depends on the temperature difference between the two liquids. The total heat transfer rate of the column depends on how far the distillate operating curve is separated to the right of the solution operating curve. The total heat transfer rate can be estimated using the equation shown in FIGURE 3.

At the liquid surface, temperature 1W minus tempearture 2B must be kept small. This is because the output of the distillate heater is small and the flow of distillate through the heater is large. Major curve separation, therefore, can be achieved only by separating temperatures 2W and 1B, at the bottom of the stratification column. The steady state heat ouptput of the distillate heater is so small that it alone could not appreciably separate the distillate and solution operating curves. During the start-up procedure, however, the total heat transfer rate is increased many times that of the distillate heater.

Start-up is accomplished in two phases. In the first phase the upper part of the distiller is heated and air driven from the vapor space. In the second phase the heat and mass transfer rate is built up. Reference is made to FIGURES 1 and 3 in the following sequence of start-up steps:

Before start-up (1) The distiller is charged with distillate and cold feed solution.

(2) The set points of pressure controller 68 are set above operating pressure range so that cold distillate flow through three-way control valve 63 will be to the bottom of the condenser sump.

(3) The set points of temperature controller 69 are set above operating temperature range.

(4) Vent valve 30 is open. Start-up valve 32 is open. Start-up valves 33 and 34 are closed.

Heat-up phase (1) Flow is started through recirculating pump 23.

(2) Distillate heater 53 is fired up to full output.

(3) When the temperature of liquid surface 15 reaches boiling, large distillate pump 24 is started at minimum flow. At first temperatures 2B, 1T and 1W move to the right. Then temperatures in the lower elevations move to the right.

(4) When temperature 2W begins to move to the right, primary solution pump 21 is started.

(5) When the temperature of concentrated solution 11, leaving the distiller, begins to rise, secondary solution pump 22 is started.

(6) Heating is continued until the vapor has driven the air from the vapor space. Vent valve 30 is then closed and the vapor pressure allowed to rise.

Heat and mass transfer build-up phase (1) Start-up valve 34 is opened. Start-up valve 32 is closed. The vapor pressure hesitates and then continues to rise.

(2) Start-up valve 33 is opened slightly and minimum flow is started through small distillate pump 25. The vapor pressure continues to rise.

(3) Cold distillate flow through large distillate pump 24 and small distillate pump 25 is increased gradually until operating flows have been reached. Care is taken so that the vapor pressure does not drop below atmospheric pressure. Temperature 2W moves to the right of temperature 1B indicating that major curve separation is taking place. The flow of product distillate 8 increases.

(4) The set points of pressure controller 68 are set down to operating pressure range.

(5) The set points of temperature controller 69 are set down to operating temperature range.

(6) The output of distillate heater 53 is cut back to operating level.

Curve separation in the temperature stratification column sets into motion a natural refrigeration effect. This effect is experienced when the fingers are quickly touched to the metal bottom of a pot of boiling liquid. While boiling continues, the bottom is felt to be cold. The significance of this phenomenon is that a heat flux is set up in a heated turbulent liquid. The heat flux is directed upward in opposition to the pull of gravity.

In a temperature stratification column heating tubes extend through a boiling liquid surface deep into progressively cooler liquid. For most of the way down heat transfer is by turbulent natural convection. Chains of eddy-like swirls extend upward along the heating tubes to the liquid surface. This is illustrated in FIGURE 4.

Each chain of swirls behaves like a series of interconnected mechanical refrigerating stages. Heat moves from the lower elevations up to the boiling surface. A mathematical expression, at the bottom of FIGURE 4, shows that the production of vapor depends on the temperature difference between the distillate and feed solution at the bottom of the column and not at the top.

From the above it is seen that the distiller described here is like a refrigerating machine. It does refrigerating work by raising heat from lower temperatures to higher temperatures by the application of energy. The applied energy is the thermal energy of the distillate inside the tubes. The transfer heat is that in the solution outside the tubes.

The inventor claims:

1. A distiller for separating distillate from a solution including the following: means flowing cold feed solution into the distiller; means dividing cold feed solution into primary solution and secondary solution; means flowing primary solution into space surrounding a distillate tube in a temperature stratification column; means flowing secondary solution into the bottom of a solution tube in a sink well; said distillate tube heating primary solution as it rises in the temperature stratification column; means separating vapor from solution at a liquid surface in the temperature stratification column; means passing vapor from the temperature stratifcation column to vapor space in a condenser; means passing concentrated solution from the temperature stratification column to the sink well; said solution tube cooling concentrated solution as it descends in the sink well; means passing concentrated solution from the sink well out of the distiller; means heating secondary solution as it rises inside said solution tube; means passing secondary solution from said solution tube and mixing it with primary solution in the temperature stratification column; a spray nozzle passing cold distillate into vapor space in the condenser; hot sump distillate accumulating in an upper part of a condenser sump; means passing hot sump distillate through a distillate heater, hot sump distillate being heated and leaving as heated hot sump distillate; means passing heated hot sump distillate to the top of said distillate tube; heated hot sump distillate being cooled as it descends in said distillate tube and exiting as cold distillate; means passing cold distillate from the distiller as product distillate; means conducting cold distillate from said distillate tube to a lower part of a condenser sump and to said spray nozzle; means withdrawing cold distillate from a lower part of a condenser sump and feeding it to said spray nozzle.

2. A distiller as in claim 1 comprising: a temperature stratification column, being a closed vessel including a primary solution inlet, concentrated solution outlet, vapor outlet, secondary solution inlet and a distillate tube; a condenser, being a closed vessel including a vapor inlet, a spray nozzle, a sump, a hot sump distillate outlet in an upper part of the sump, and a cold distillate connection in a lower part of the sump; a distillate heater including a hot sump distillate inlet, means of heating the hot sump distillate and a heated hot sump distillate outlet; a sink well, being a closed vessel including a concentrated solution inlet, concentrated solution outlet and a solution tube.

3. A distiller as in claim 1 including: a pump taking suction from a source of cold feed solution and discharging into space surrounding a distillate tube in the temperature stratification column, a pump taking suction from a source of cold feed solution and discharging into the bottom of a solution tube in a sink well, a pump taking suction from the bottom of a distillate tube and discharging into a lower part of a condenser sump and through a spray nozzle into vapor space of a condenser, a pump taking suction from a lower part of a condenser sump and discharging through a spray nozzle into vapor space of a condenser.

4. A distiller as in claim 1 including: a two-way control valve in a flow of concentrated solution from the distiller, a liquid level controller for sensing increases in the level of a liquid surface in the temperature stratification column, said liquid level controller correcting for level increases by operating said two-way control valve to release concentrated solution from the distiller.

5. A distiller as in claim 1 including: a two-way control valve in a flow of product distillate from the distiller, a liquid level controller for sensing increases in the level of a liquid surface in a condenser, said liquid level controller correcting for level increases by operating said two-way control valve to release product distillate from the distiller.

6. A distiller as in claim 1 including: a three-way control valve in the flow of cold distillate from a distillate tube to a condenser, a pressure controller with high and low pressure set points and sensing the vapor pressure in the distiller, during pressure rise said controller operating said three-way control valve to direct said flow of cold distillate to a lower part of a condenser sump, during pressure drop said controller operating said three-way control valve to direct said flow of cold distillate through a spray nozzle into vapor space of a condenser.

7. A distiller as in claim 1 including: a flow control in a flow of cold feed solution to the temperature stratification column, a temperature controller with high and low temperature set points and sensing the temperature of distillate in a condenser sump, during temperature rise said temperature controller operating said flow control to reduce said flow of cold feed solution, during temperature drop said temperature controller operating said flow control to increase said flow of cold feed solution.

8. A distiller as in claim 12 including: a recirculating pump taking suction from an upper part of a condenser sump and discharging through a spray nozzle into vapor space of a condenser.

9. A distiller as in claim 8 including the following start-up appendages: a distillate conduit containing a valve, said conduit connecting a heated hot sump distillate outlet of a distillate heater to an inlet of a recirculating pump; a valve to block discharge from a pump taking suction from a lower part of a condenser sump and discharging through a spray nozzle into vapor space of a condenser; a valve to block hot sump distillate flow to a recirculating pump.

10. A distiller for separating distillate from a solution including the following: means flowing cold feed solution into the distiller; means flowing cold feed solution into space surrounding a distillate tube in a temperature stratification column; said distillate tube heating feed solution as it rises in the temperature stratification column; means separating vapor from solution at a liquid surface in the temperature stratification column; means passing vapor from the temperature stratification column to vapor space in a condenser; means passing concentrated solution from the temperature stratification column out of the distiller; a spray nozzle passing cold distillate into vapor space in the condenser; hot sump distillate accumulating in an upper part of a condenser sump; means passing hot sump distillate through a distillate heater, hot sump distillate being heated and leaving as heated hot sump distillate; means passing heated hot sump distillate to the top of said distillate tube; heated hot sump distillate being cooled as it descends in said distillate tube and exiting as cold distillate; means passing cold distillate from the distiller as product distillate; means conducting cold distillate from said distillate tube to a lower part of a condenser sump and to spray nozzle; means withdrawing cold distillate from a lower part of a condenser sump and feeding it to said spray nozzle.

11. A distiller as in claim 10 comprising: a temperature stratification column, being a closed vessel including a cold feed solution inlet, concentrated solution outlet, vapor outlet and a distillate tube; a condenser, being a closed vessel including a vapor inlet, a spray nozzle, a sump, a hot sump distillate outlet in an upper part of the sump and a cold distillate connection in a lower part of the sump; a distillate heater including a hot sump distillate inlet, means of heating the hot sump distillate and a heated hot sump distillate outlet.

12. A distiller as in claim 10 including: a pump taking suction from a source of cold feed solution and discharging into space surrounding a distillate tube in the temperature stratification column, a pump taking suction from the bottom of a distillate tube and discharging into a lower part of a condenser sump and through a spray nozzle into vapor space of a condenser, a pump taking suction from a lower part of a condenser sump and discharging through a spray nozzle into vapor space of a condenser.

13. A distiller as in claim 10 including: a two-way control valve in a flow of concentrated solution from the distiller, a liquid level controller for sensing increases in the level of a liquid surface in the temperature stratification column, said liquid level controller correcting for level increases by operating said two-way control valve to release concentrated solution from the distiller.

14. A distiller as in claim 10 including: a two-way control valve in a flow of product distillate from the distiller, a liquid level controller for sensing increases in the level of a liquid surface in a condenser, said liquid level controller correcting for level increases by operating said two-way control valve to release product distillate from the distiller.

15. A distiller as in claim 10 including: a three-way control valve in the flow of cold distillate from a distillate tube to a condenser, a pressure controller with high and low pressure set points and sensing the vapor pressure in the distiller, during pressure rise said controller operating said three-way control valve to direct said flow of cold distillate to a lower part of a condenser sump, during pressure drop said controller operating said three-way control valve to direct said flow of cold distillate through a spray nozzle into vapor space of a condenser.

16. A distiller as in claim 10 including: a flow control in a flow of cold feed solution to the temperature stratification column, a temperature controller with high and low temperature set points and sensing the temperature of distillate in a condenser sump, during temperature rise said temperature controller operating said flow control to reduce said flow of cold feed solution, during temperature drop said temperature controller operating said flow control to increase said flow of cold feed solution.

17. A distiller as in claim 10 including: a recirculating pump taking suction from an upper part of a condenser sump and discharging through a spray nozzle into vapor space of a condenser.

18. A distiller as in claim 10 including the following start-up appendages: a distillate conduit containing a valve, said conduit connecting a heated hot sump distillate outlet of a distillate heater to an inlet of a recirculating pump; a valve to block discharge from a pump taking suction from a lower part of a condenser sump and discharging through a spray nozzle into vapor space of a condenser; a valve to block hot sump distillate flow to a recirculating pump.

References Cited
UNITED STATES PATENTS

| | | | |
|---|---|---|---|
| 2,389,064 | 11/1945 | Latham | 159—24 X |
| 2,979,442 | 4/1961 | Badger. | |
| 3,021,265 | 2/1962 | Sadtler et al. | 202—177 X |
| 2,226,828 | 12/1940 | Moran | 202—177 |

NORMAN YUDKOFF, *Primary Examiner.*

J. SOFER, *Assistant Examiner.*

U.S. Cl. X.R.

202—185, 202; 203—11, 25